United States Patent [19]

Rubin

[11] 4,006,341
[45] Feb. 1, 1977

[54] CARD COMPARING APPARATUS

[75] Inventor: Alan M. Rubin, Aldan, Pa.

[73] Assignee: John P. Glass, Essington, Pa.

[22] Filed: Aug. 27, 1971

[21] Appl. No.: 175,617

[52] U.S. Cl. .......................... 235/61.7 R; 209/80.5;
235/61.11 A; 235/61.12 R; 40/2.2
[51] Int. Cl.[2] ................ G06K 7/04; G06K 19/04;
B07C 3/10; G09F 3/02
[58] Field of Search .................... 209/80.5, 110.5;
235/61.11 B, 61.11 A, 61.12 C, 61.7 B, 61.7
R, 61.12 R, 61.11 C; 340/149 A; 200/46;
40/2.2

[56] References Cited
UNITED STATES PATENTS

| 1,739,087 | 12/1929 | Perkins | 235/61.12 R |
|---|---|---|---|
| 2,198,127 | 4/1940 | Rembold | 235/61.12 R |
| 2,213,607 | 9/1940 | Nevin | 235/61.12 R |
| 2,515,424 | 7/1950 | Rembold | 235/61.12 R |
| 3,292,631 | 12/1966 | Cross | 209/80.5 |
| 3,519,767 | 7/1970 | Sinker | 200/46 |
| 3,524,545 | 8/1970 | Doundoulakis | 209/80.5 |
| 3,552,562 | 1/1971 | Silverberg | 209/80.5 |
| 3,624,938 | 12/1971 | Richard | 40/2.2 |
| 3,644,713 | 3/1972 | Hayakawa | 235/61.9 R |

Primary Examiner—Daryl W. Cook
Assistant Examiner—Robert M. Kilgore
Attorney, Agent, or Firm—Smith, Harding, Earley & Follmer

[57] ABSTRACT

Card comparing apparatus comprising spaced-apart side walls having facing grooves formed therein for receiving a first and a second card in parallel spaced relationship, each of said cards having a predetermined number of notches along its edges, said notches being varied as to depth, and apparatus for determining whether corresponding notches in the cards are of the same depth, said determining apparatus including pairs of vertically disposed probes in sliding contact with each other, said probes being electrically insulating except for an electric conductor vertically positioned in each probe so that said conductors make electrical contact when the probes are in alignment, a series of vertical slots formed in the spaced-apart side walls, said probes being positioned in said slots, springs urging the probes inwardly to enter the notches in said cards, and signal means actuated by said electrical conductors when all corresponding probes are in alignment to complete an electrical circuit.

4 Claims, 5 Drawing Figures

INVENTOR
ALAN M. RUBIN

BY Smith, Harding
Earley & Follmer
ATTORNEYS

CARD COMPARING APPARATUS

BACKGROUND OF THE INVENTION

In treating patients in hospitals, the medicines, blood, and the like, to be administered to a particular patient are made up at a location in the hospital which is remote from the patient. This medication is identified as to the patient who is to receive it by attaching thereto a card which is embossed with the name and admission number of the patient,, and it is delivered to the floor nurse who is to administer said medication to the patient. The patient is provided with an identification card embossed with the identical information of name and admission number, and this card may be hung on a string around the patient's neck. The nurse then compares the card on the medicine package with the card around the neck of the patient by visually inspecting both cards. If both cards match, she knows that this particular medicine is intended for this particular patient and proceeds to administer it.

This system has the advantage of matching the correct medicine, blood, and the like with the intended patient, even though the patient may not be able to respond to questions by the nurse because of the patient being unconscience or otherwise incapacitated.

However, this system is subject to error if, for example, two patients are in the same hospital and have the same name, or names which appear very similar with perhaps only one letter in the names being different. Of course, in such cases of the same or similar names, the different admission numbers given to the patient should serve to distinguish one patient from the other. However, such numbers may be very similar and may have just the last two numbers transposed, for example. On occasions in the past, such similarities of names and numbers have caused confusion that resulted in the wrong patient being given the wrong type of blood or medicine, and such mistakes have caused death or serious harm to the patients.

Summary of the Invention

Accordingly, it is an object of this invention to provide error-free card comparing apparatus for comparing two cards and finding an identity or a mismatch between them.

It is another object to prevent mistakes in matching identification cards on packages of blood, medicine, and the like, with identification cards of hospital patients.

It is another object to provide means for validating a match between an individual's card and a master card.

This invention provides apparatus for positive matching of two identification cards, similar to gasoline credit cards, by physically mating the two cards and verifying that the cards are identical, without relying on human or machine reading of the information on the cards.

All human or machine reading operations have a predictable error because the information on two identification cards must be read from the cards and then compared in a subsequent operation to determine whether the cards are identical or dissimilar in one or more letters or numbers on the cards. For example, the nurse must read the cards on the package of medicine or blood, then read the card on the patient, and then mentally compare the two to determine whether or not they are identical or dissimilar.

The invention involves a comparator machine which determines whether or not two cards are identical, or dissimilar, or have some predetermined relationship in the depth of one or more notches punched into the edges of the cards.

DESCRIPTION OF THE PREFERRED EMBODIMENT

Figure 1:
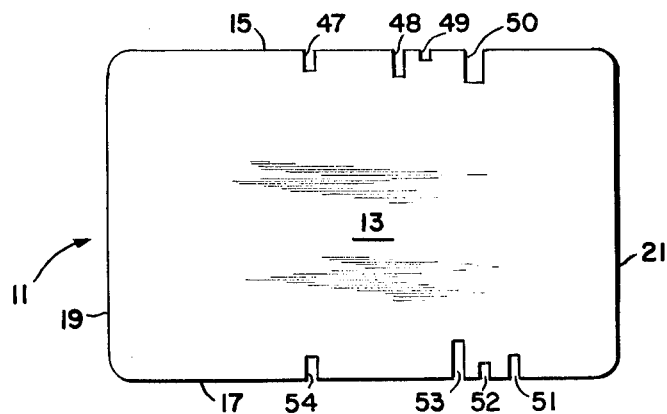
FIG. 1 is a view in top plan of a card constructed in accordance with this invention.
Figure 2:
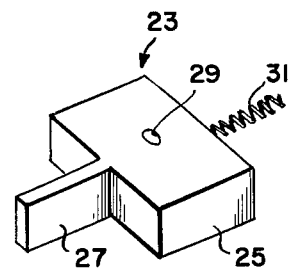
FIG. 2 is a view in perspective of a probe which forms an element of the invention.
Figure 3:
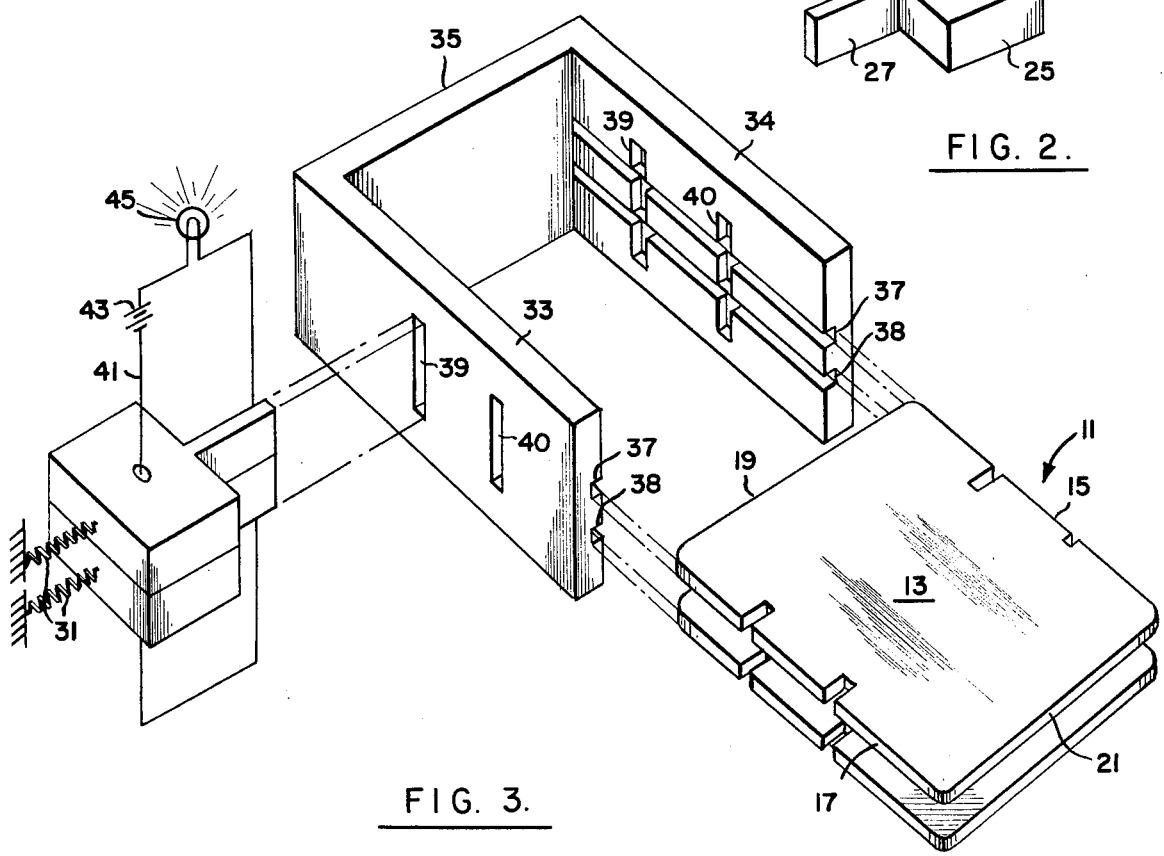
FIG. 3 is a diagrammatic view in perspective of card comparing and validating apparatus.

Turning now to the specific embodiment of the invention shown in FIGS. 1 to 3 of the drawings, there is shown a card 11 which may be a patient identification card for use in a hospital, a credit card, or the like. Card 11 has a front face 13, top edge 15, bottom edge 17, and side edges 19 and 21. Information such as name and serial number may be embossed on the card as is conventional.

FIG. 2 shows a view in perspective of a probe 23 made of an electrically insulating material such as a synthetic resin. Probe 23 includes a base portion 25 and a sensing portion 27 which is narrower than base portion 25. An electrical conductor 29 is positioned vertically in base portion 25 and a spring 31 is mounted on the rear of base portion 25 so as to urge the probe 23 in the direction of sensing portion 27.

The card comparing or validating apparatus includes a pair of spaced apart slide walls 33, 34, which are connected together by an end wall 35.

Two pairs of facing grooves 37, 38 are horizontally disposed and formed in side walls 33, 34 and are adapted to receive two cards in order to compare them.

Pairs of vertically disposed facing slots 39, 40 are formed in side walls 33, 34 and are adapted to receive sensing portions 27 of a pair of probes 23 positioned in sliding contact, one above the other.

An electrical circuit may be connected in series with electrical conductors 29 of the probes, and includes electrical conductors 41, a power source such as batteries 43, and a signal means such as lamp 45 which is caused to illuminate when the circuit through conductors 29 is closed. In the event that more than one pair of probes is to be used, the circuit is series connected so that it is completed to illuminate the lamp when each pair of probes is in alignment.

Cards 11 are provided with a predetermined number of notches 47-54. The depths of the notches may, for example, be coded such that they correspond to the numbers from 0 to 9.

In operation, two cards 11 are inserted into the validating apparatus by sliding the top card into grooves 37 and the bottom card into grooves 38 of slide walls 33, 34. The spring loaded, electrically insulating probes 23 have their sensing portions 27 positioned in vertical slots 39, 40, and are arranged in pairs, with an upper probe adapted to contact the notches in the upper card, and the lower probe adapted to contact the notches in the lower card. The upper probes are in sliding contact with the lower probes, and if the corresponding notches in the two cards are the same, the electrical contacts 29 in the vertical pairs of probes 23 will make contact. Since the probes are in alignment, this will complete the electrical circuit to cause lamp 45 to illuminate.

When the corresponding slots in the two cards are of different depths, the probes do not line up, and the conductors 29 do not make contact so that the electrical circuit is not completed.

Besides causing lamp 45 to illuminate, it will be realized that the closing of the circuit could be used to perform other operations, such as opening a door.

Figure 4:
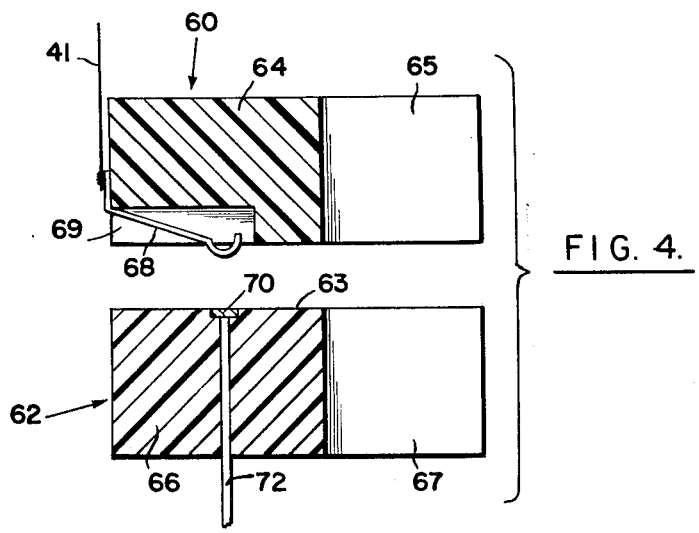
FIG. 4 is a sectional view of a modification.

In FIG. 4 there is shown a modified form of making the electrical contact between the probes. Such means comprises an upper probe 60 and a lower probe 62 made of electrically insulating material and having the same general configuration of the probe 23. Probe 60 is provided with a base portion 64 and a sensing portion 65. Probe 62 is provided with a base portion 66 and a sensing portion 67. Base portion 64 of the upper probe 60 is provided with an electrical conductor 68 in the form of a leaf spring contact contained in a recess 69 in the base portion 64. The contact 68 is normally positioned as shown in FIG. 4 but will be bent into the recess 69 when the probes 60 and 62 are positioned in overlying contact such as is shown in FIG. 3. Accordingly, the contact portion of contact 68 will be biased into contact with the upper wall 63 of the lower probe 62 during normal operation. Probe 62 is provided with an electrical contact 70 mounted in a recess in the upper wall 63 thereof and arranged to be contacted by the contact 68 when the probes 60 and 62 are in alignment. Probe 62 is also provided with an electrical conductor 72 which extends from contact 70 through base portion 66 for connection to the electrical circuit of the card comparing apparatus which is shown and described with respect to the embodiment of the invention shown in FIGS. 1 to 3. Thus, contact 68 is shown as connected to the electrical conductor 41.

It will be apparent that in use the arrangement shown in FIG. 4 would operate the same as the embodiment shown in FIG. 3 with the probes 60 and 62 being positioned in slidng contact. This modification has the advantage that a very effective contact is provided between the conductor 68 in upper probe 60 and the conductor 70 in lower probe 62.

Figure 5:
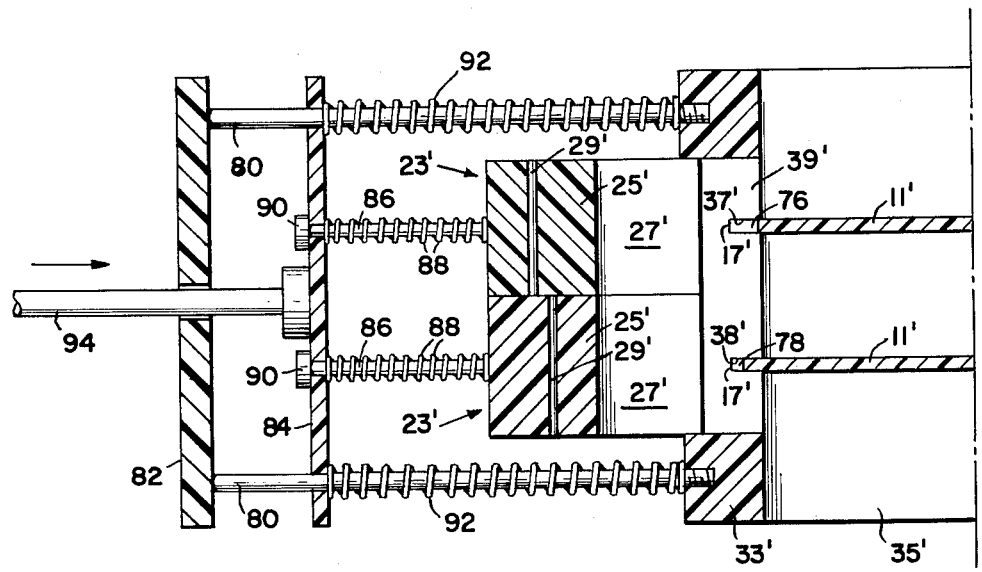
FIG. 5 is a sectional view of another modification.

The form of the invention shown in FIG. 5 is essentially the same as that shown in FIGS. 1 to 3 wherefore corresponding parts will be given like reference numerals with primes added. Referring to this figure, there is shown a pair of notch containing cards 11' provided with edges 17' which slide into grooves 37' and 38' horizontally disposed in the side wall 33' of the card comparing apparatus. The side wall 33' is connected with another side wall (not shown) by an end wall 35' as was described above with respect to the embodiment of FIGS. 1 to 3. There are provided a pair of probes 23' made of an electrically insulating material, each probe including a base portion 25' and a narrower sensing portion 27'. A vertically disposed slot 39' is formed in side wall 33' and is adapted to receive the sensing portion 27' of the pair of probes 23' which are positioned in sliding contact one above the other.

The probes 23' are provided with vertically extending conductors 29' in the base portions 25' thereof, which conductors 29' are arranged so that the apparatus will operate when the cards 11' have notches of different depths but of a predetermined depth relationship. This arrangement is particularly useful for security purposes since it would prevent someone from copying his own card exactly and using two identical cards to operate the apparatus. To this end, the conductor 29' for the upper probe is spaced farther from the card contacting end of the sensing portion 27' than the conductor 29' for the lower probe 23' as is apparent from FIG. 5. It will thus require notches having different depths of a predetermined relationship to position the probes 23' with their conductors 29' in alignment. The nothces 76 and 78 in the upper and lower cards 11', respectively, are of depths having the proper predetermined relationship. It will be apparent that the notch 78 would limit the inward movement of the lower probe 23' at a position outwardly of the position whereat the notch 76 would limit the inward movement of the upper probe 23'.

Means are provided in the form of the invention shown in FIG. 5 for normally positioning the probes 23' in the retracted position shown in FIG. 5. To this end, there are provided a pair of guide pins 80 mounted at one end in side wall 33' and connected at the other end to a base plate 82. Mounted for sliding movement on the guide pins 80 is a bracket member 84 which slidably carries a pair of pins 86 which are secured at their inner ends to the base portions 25' of the probes 23'. A pair of springs 88 are mounted on pins 86 in compression between bracket 84 and the base portions 25' of the probes 23'. The pins 86 extend through the bracket 84 for connection to head portions 90 which limit the separating movement between bracket 84 and the probes 23' to the position shown in FIG. 5. A pair of springs 92 are mounted on the guide pins 80 in compression between side wall 33' and bracket 84 and serve to bias the bracket 84, and the probes 23' connected thereto, to the position shown in FIG. 5. An actuator rod 94 extends through base plate 82 for contact with the bracket member 84.

In operation, when it is desired to actuate the probe 23' into sensing contact with cards 11' which have been positioned in grooves 37' and 38' as shown in FIG. 5, the actuator rod 94 is moved inwardly in the direction shown by the arrow in FIG. 5. This will cause the bracket 84 to slide along guide pins 80 against the bias of springs 92 toward the side wall 33'. The probes 23' connected to bracket 84 will also be moved inwardly until the sensing portions 27' thereof contact the end of the corresponding notches 76 and 78 after which time their movement is arrested. The inward movement of the actuator arms 94 is continued until such sensing contact is made, the movement being accommodated by the compression of the springs 88 and 92. After the card comparing operation is completed, the actuator arm 94 is released after which the springs 86 and 92 serve to return the parts to the retracted position shown in FIG. 5.

It will be apparent that the invention is applicable for use in comparing more than two cards so that the cards of more than two persons are required to actuate the device. This may be accomplished simply by providing more slots for additional cards as well as additional rows of probes.

Another variation is that the means for determining whether the corresponding notches in the cards are of a predetermined relation may be mechanical as well as electrical. This may be achieved simply by dropping a pin into holes in the probes, the pin falling through both probes when the holes are in alignment.

A further modification of the invention may involve the use of the notched card in the form of a key-like member whereby only individuals with a proper key may actuate an apparatus.

It is to be understood that the forms of the invention herewith shown and described are to be taken as presently preferred embodiments. Various changes may be made in the shape, size and arrangment of parts. For example, equivalent elements may be substituted for those illustrated and described herein, parts may be reversed, and certain features of the invention may be utilized independently of the use of other features, all without departing from the spirit or scope of the invention as defined in the subjoined claims.

I Claim:

1. Card comparing apparatus comprising means for receiving a first and a second card in parallel spaced relationship, each of said cards having a predetermined number of notches along at least one of its edges, said notches being varied as to depth, and means for determining whether corresponding notches in the cards are of a predetermined depth relationship, said determining means including a pair of vertically disposed probes in sliding contact with each other, said probes being electrically insulating except for an electrical conductor positioned on each probe so that said conductors make electrical contact when the probes are in alignment, a series of slots in spaced-apart sidewalls, side probes being positioned in said slots, means for urging the probes inwardly to enter the notches in said cards, and signal means actuated by said electrical conductors when all corresponding probes are in alignment to complete an electrical circuit, said electrical conductors extending vertically through each probe.

2. Card comparing apparatus comprising means for receiving a first and a second card in parallel spaced relationship, each of said cards having a predetermined number of notches along at least one of its edges, said notches being varied as to depth, and means for determining whether corresponding notches in the cards are of a predetermined depth relationship, said determining means including a pair of vertically disposed probes in sliding contact with each other, said probes being electrically insulating except for an electrical conductor positioned on each probe so that said conductors make electrical contact when the probes are in alignment, a series of slots in spaced-apart sidwalls, said probes being positioned in said slots, means for urging the probes inwardly to enter the notches in said cards, and signal means actuated by said electrical conductors when all corresponding probes are in alignment to complete an electrical circuit. the electrical conductor on one probe being spring biased toward the adjacent probe.

3. Card comparing apparatus comprising means for receiving a first and a second card in parallel spaced relationship, each of said cards having a predetermined number of notches along at least one of its edges, said notches being varied as to depth, and means for determining whether corresponding notches in the cards are of predetermined depth relationship, said determining means including a pair of vertically disposed probes in sliding contact with each other, said probes being electrically insulating except for an electrical conductor positioned on each probe so that said conductors make electrical contact when the probes are in alignment, a series of slots in spaced-apart sidewalls, said probes being positioned in said slots, means for urging the probes inwardly to enter the notches in said cards, and signal means actuated by said electrical conductors when all corresponding probes are in alignment to complete an electrical circuit, said determining means including spring means for moving the probe to a position out of contact with said cards.

4. Card comparing apparatus comprising means for receiving a first and a second card in parallel spaced relationship, each of said cards having a predetermined number of notches along at least one of its one of its edges, said notches being varied as to depth, and means for determining whether corresponding notches in the cards are of predetermined depth relationship, said determining means including a pair of juxtapositioned probes in sliding contact with each other, each of said probes including an electrically insulating portion having an electrical conductor positioned therein so that said conductors make electrical contact when the probes are in alignment, a series of slots in spaced-apart side walls, said probes being positioned in said slots, means for urging the probes inwardly to enter the notches in said cards, and signal means actuated by said electrical conductors when all corresponding probes are in alignment to complete an electrical circuit.

* * * * *